United States Patent Office 3,192,007
Patented June 29, 1965

3,192,007
BLENDING OF POLYPROPYLENE WITH UN-
METALLIZED CHELATING AGENT TO
IMPROVE DYEABILITY
Albin F. Turbak, New Providence, N.J., assignor to Esso
Research and Engineering Company, a corporation of
Delaware
No Drawing. Filed Dec. 26, 1962, Ser. No. 247,372
8 Claims. (Cl. 8—55)

This invention relates to a process for treating alpha olefin polymers to render them dyeable.

Poly alpha olefin polymers have found increasing interest as textile fibers and materials because of their desirable properties of strength and low cost. One of the more difficult problems encountered, however, has been the poor dye acceptance of such fibers because of the inertness of a hydrocarbon polymer. Although a poly alpha olefin material, such as polypropylene, can be dyed, its fastness to typical textile environments has been inadequate.

It has new been found that the receptivity of alpha olefin polymers to dyeing may be improved by blending the polymer with 0.1 to 20 weight percent, preferably 0.5 to 10.0 weight percent of an unmetallized chelating agent; spinning the blend into fibers; and then contacting these fibers with metallized dyes containing at least one salicylic acid function or at least one o,o'-dihydroxy azo function. These dyes which are among the dyes known as acid mordant dyes must additionally contain no more than one sulfonic acid group. When the polymer is treated in this manner, not only is the dye uptake improved, but more importantly, the resistance of the dyed product to light, washing, and dry cleaning is improved.

While this invention is principally directed to the dyeing of fibers or filaments, it may also be used to dye poly alpha olefin films, foils, and other formed products.

The polymers treated by the process of the invention are alpha olefin homopolymers and copolymers. The alpha olefin homopolymer can be prepared by any known process, such as the so-called Ziegler process, see for example Belgian Patent 533,362 and Belgian Patent 538,782. Examples of homopolymers within the scope of the invention include polyethylene, polypropylene, poly 1-butene, poly 1-heptene, and polyisobutylene. Polymers or copolymers of branched chain alpha olefins where the branching occurs no closer than the third carbon atom can also be employed such as poly 4,4-dimethyl-1-pentene, poly 4-methyl-1-pentene and poly 3-methyl-1-butene. In general, the homopolymers are prepared from alpha olefins having from 2 to 12 carbon atoms. The copolymers employed in the process of the invention include copolymers of two different alpha olefins such as ethylene-propylene copolymers, ethylene-1-hexene copolymers, and alpha olefin-aromatic olefine copolymers containing from 1 to 15% by weight of an aromatic olefin, such as for example copolymers of styrene and 4-methyl-1-pentene. Also, blends of one or more of the previously mentioned polymers can be employed. The polymers and copolymers employed in the invention have molecular weights ranging from 100,000 to 1,000,000. The preferred polymers and copolymers of the invention are those prepared by the use of alkyl metal catalysts. Most preferred is polypropylene. Catalysts which are useful in this process are mixtures of reducible heavy transition metal compounds and reducing metal containing substances, or mixtures of partially reduced heavy transition metal compounds and organometallic activators. Examples of these catalysts are $TiCl_4 + AlEt_3$ and $TiCl_3 + AlEt_3$. The catalysts used for preparing the preferred polymers employed in the instant process are those catalysts given on page 6, line 20, to page 10, line 21, of copending application Serial No. 831,210, filed August 3, 1959.

The unmetallized chelating agents which are useful in this invention are those compounds which can bind heavy metals by means of intramolecular hydrogen bonding. These include 8-hydroxyquinoline, 2-mercaptobenzothiazole, picolinic acid, quinolinic acid or partial esters thereof, ethylenedinitrilotetraacetonitrile, diguanidine, propyl gallate or other higher gallic acid esters, phthalonitrile, partial esters of ethylenedinitrilotetraacetic acid, and iminotriacetic acid. Preferred are 8-hydroxyquinoline and 2-mercaptobenzothiazole. Most preferred is 2-mercaptobenzothiazole.

The dyes which are suitable for use in this invention are those aromatic dyes which contain at least one salicylic acid function or at least one o,o'-dihydroxy azo function. Additionally these dyes must contain no more than one sulfonic acid group, preferably none at all.

Examples of dyes with salicylic acid groups include Calcochrome Brilliant Blue BBG, Calcochrome Orange R, Apochrome Yellow Y, Apochrome Flavine, Erie Yellow KM, Solatine Yellow 5 GAD, Chrome Yellow A Extra, Chromoxane Brilliant Violet SBA, Fast Mordant Yellow GD, Erie Orange 2R, Diamond Green SSG, and Acid Anthracene Brown GD.

Examples of acceptable dyes containing an o,o'-dihydroxy azo group include Aposide Violet BS, and Chrome Fast Orange 3RLA. Preferred is Aposide Violet BS. The colour index names and chemical formulae of all of the above identified dyes, as well as all other dyes named in this specification, are given below in Table I.

As was noted above, those dyes containing two or more sulfonic acid groups are not operative in this invention. Thus, for example Erie Green GY, which contains a salicylic acid group and two sulfonic acid groups, is not useful. Similarly, Fast Mordant Blue B which contains an o,o'dihydroxy azo group and two sulfonic acid groups has no utility in the present invention.

Dyes which do not have the salicylic acid function or the o,o'dihydroxy azo function are not operative in this invention. Thus for example dyes which have an o-hydroxy, o-amino azo structure, and dyes which have an o-hydroxy, o'carboxy azo structure in place of the functions necessary in this invention are inoperative. Examples of such inoperative dyes include Diazine Orange GR, Acid Alizarine Flavine RA Extra, Diamond Red ECB, Acid Anthracene Brown RHA, Chrome Brown LLR and Acid Anthracene Brown PG Extra.

The following table lists representative dyes and their structures which have been tested in connection with this invention.

TABLE I. DYE STRUCTURES

A. GOOD DYES

| Dye Name (Color Index No.) | Structure |
|---|---|
| Calcochrome Brilliant Blue BBG (Mordant Blue #1) | Triphenylmethane-type structure with two HO-/CH₃ substituted rings bearing HOOC- and COONa groups, central C bonded to a dichlorocyclohexyl ring |
| Calcochrome Orange R (Mordant Orange #1) | $O_2N-C_6H_4-N=N-C_6H_3(COONa)(OH)$ |
| Apochrome Yellow Y (Mordant Yellow #18) | $C_6H_5-N=N-C_6H_3(COOH)(OH)$ |
| Apochrome Flavin Conc. (Mordant Yellow #36) | $HO-C_6H_4-C_6H_4-N=N-C_6H_3(COOH)(OH)$ |
| Erie Yellow KM (Direct Yellow #20) | $HO-C_6H_2(COONa)(CH_3)-N=N-C_6H_4-C_6H_4-N=N-C_6H_2(COONa)(OH)(CH_3)$ |
| Solantine Yellow 5GAD (Direct Yellow #26) | $HO-C_6H_3(COONa)-N=N-C_6H_4-NH-CO-NH-C_6H_4-N=N-C_6H_3(COONa)(OH)$ |
| Chrome Yellow A Extra (Mordant Yellow #5) | $HO-C_6H_3(COONa)-N=N-C_6H_3(COONa)(OH)$ |
| Chromoxane Brilliant Violet 5BA (Mordant Violet #11) | Triphenylmethane-type with HO-/CH₃ rings, HOOC and COOH groups, central C bonded to a p-tolylamino-phenyl group |
| Fast Mordant Yellow GD Conc. (Mordant Yellow 16) | $HO-C_6H_3(COONa)-N=N-S-C_6H_4-N=N-C_6H_3(COONa)(OH)$ |
| Aposide Violet BS (Mordant Violet #5) | $(NaO_3S)(HO)C_6H_3-N=N-C_6H_4(OH)$ |
| Chrome Fast Orange 3RLA (Mordant Orange #4) | $(NaO_3S)(OH)(O_2N)C_6H_2-N=N-C(pyrazolone ring with OH, CH_3, N-phenyl-Cl)$ |

TABLE I. DYE STRUCTURES—Continued

A. GOOD DYES—Continued

| Dye Name (Color Index No.) | Structure |
|---|---|
| Erie Orange 2R (Direct Orange #8) | [naphthalene-NH₂, SO₃Na]—N=N—[benzene]—[benzene]—N=N—[benzene with COONa, OH] |
| Diamond Green SSG (Mordant Green #12) | HO—[benzene with COONa(OH)]—N=N—[naphthalene]—N=N—[naphthalene with OH, OH, SO₃Na] |
| Acid Anthracene Brown GD (Mordant Brown 18) | Na₃OS—[benzene]—N=N—[benzene with OH, COONa]—N=N—[benzene]—NH₂ |

B. POOR DYES

| Dye Name (Color Index No.) | Structure |
|---|---|
| Erie Green GY (Direct Green #8) | HO—[benzene with COONa]—N=N—[benzene]—[benzene]—N=N—[naphthalene with OH, OH, SO₃Na, SO₃Na]—N=N—[benzene]—NO₂ |
| Diazine Orange GR (Direct Orange 73) | [benzene-NH₂]—N=N—C(—C—OH)(=N—)C—COONa —N=N—[benzene]—NHCO—[benzene]—N=N—C(HO—C)(=N—)C—COONa —N=N—[benzene-NH₂] |
| Fast Mordant Blue B (Mordant Blue 13) | [benzene with OH, Cl]—N=N—[naphthalene with OH, OH, SO₃Na, SO₃Na] |
| Acid Alizarine Flavine RA Extra (Mordant Yellow #8) | [benzene with COONa]—N=N—C(HO—C)(=N—)C(CH₃)—[benzene]—SO₃Na |
| Acid Anthracene Brown RHA (Mordant Brown #33) | [benzene with OH, NO₂]—N=N—[benzene with NH₂, SO₃Na]—NH₂ |
| Chrome Brown LLR (Mordant Brown #13) | [benzene with OH, SO₃Na]—N=N—[benzene with NH₂]—NH₂ |
| Acid Anthracene Brown PGA Extra (Mordant Brown #40) | [benzene with COONa]—N=N—[naphthalene with HO, SO₃Na]—NH—[benzene] |

The metals which are useful to form the metallized dyes of this invention are nickel, copper, aluminum, iron, cobalt and chromium, preferably chromium. These metals in the form of an inorganic salt in an aqueous solution are contacted with the dye to form a compound of the dye in combination with the metal ion. Any water soluble inorganic salt may be used such as the halides, nitrates, and sulfates, preferably chlorides. The metal ions may also be made available by the in situ reduction of metal-containing groups of higher oxidation states. For example, chromium ions of the proper valence state for reaction may be obtained by contacting potassium dichromate with a mixture of formic acid and oxalic acids. Salts of metals other than those listed, such as barium chloride have been found to have no utility in the present invention.

In general the metal is reacted with the dye by adding the dye to an aqueous solution of the metal salt containing sufficient metal ion to form about a 1/1 molar compound with the dye. It is important that the metal react with the dye in about equimolar proportions so that all of the residual orbitals of the metal are not occupied in bonding with the dye molecule leaving some orbitals available for interaction with the chelating agent in the fiber. The polymer blend which has been melt spun or extruded into fibers or molded objects is then contacted with the metal salt containing aqueous dye bath. In general the aqueous dye baths employed contain from 0.1 to 10 weight percent of dye based on the weight of the goods to be dyed. The temperature of dyeing and the time of immersion depend on the proportion of polymer in the blend, the particular polymer employed, the concentration of dye employed, and the intensity of color desired. These parameters can easily be determined by routine experimentation. The temperature of dyeing is not critical and can range from 25 to 120° C. although the dye bath is usually maintained at the boiling point.

An additional qualification for the chelating agents used in this invention is that it have a chelate formation constant with the metal of the metallized dye which is at least $1 \times 10^4$. The chelation formation constant is a measure of the ability of the chelating agent to complex with the metal and is defined by the equation:

$$\text{chelating agent} + \text{metal} \rightarrow \text{metal chelate}$$
$$\text{I} \qquad \text{II} \qquad \text{III}$$

where chelation constant

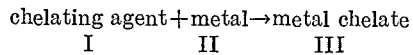

$$K = \frac{[III]}{[I][II]}$$

The concentration of each member of the equation may be measured in moles/liter and K must be at least $1 \times 10^4$, or expressed in another way log K must be at least 4.0.

Thus, for example, log K for 8-hydroxyquinoline with various metals is as follows:

With cobalt: log $K$=11.55
With nickel: log $K$=11.44
With chromium: log $K$=11+

This invention will be more fully understood by reference to the following examples.

*Example 1*

A polypropylene polymer was formed by passing propylene gas into a dispersion containing $Al(Et)_3$ and $TiCl_3$ in an aromatic diluent at a temperature of 80° C. Hydrogen was used to control the molecular weight. A crystalline polypropylene resulted having an intrinsic viscosity of 1.5 (in tetralin at 120° C.) and a melt index of 20. This polymer was spun into fibers by methods known in the art. When these fibers were contacted with the dyes of Table I (infra) dye pickup and retention was very poor.

*Example 2*

A 1% blend of 8-hydroxyquinoline with polypropylene was prepared by milling the 8-hydroxyquinoline with the polymer on a hot roll mill at 360° F. The milled sheet was then cut into chips and melt spun on a "Chemtex" multifilament spinner under the following conditions.

Spinning cylinder temperatures:
Top _____ ° F__ 350
Middle _____ ° F__ 420
Bottom _____ ° F__ 430
Pump setting _____ 12
Take-off speed, f.p.m. _____ 360
Pressure, p.s.i. _____ 540
Draw ratio _____ 435/100
Draw temp. _____ ° F__ 200
Denier _____ 143
Tenacity _____g./den__ 3.77
Percent elong. _____ 51
Intrinsic viscosity of fiber (in tetralin at 120° C.) _____ 1.74

This produced a polymer with good spinnability, good drawing characteristics and good overall fiber properties. The fibers were desirably white and not discolored.

*Example 3*

The fibers from Example 2 were pretreated by being boiled for one hour in an 0.5% solution of chromium chloride ($CrCl_3 \cdot 6H_2O$) and then contacted with the acid mordant dyes of this invention. No dye pickup was observed.

However, when the fibers containing the 8-hydroxyquinoline were added to a bath containing both dye and chromium chloride, then a good depth of color was obtained with the dyes of this invention.

In the initial run, 0.01 g. of dye was added to 100 cc. of 0.5% $CrCl_3 \cdot 6H_2O$ solution and 0.2–0.3 g. of fiber was employed so as to get 3–5% dyeings. It was later found that equal weights (0.01 g.) of dye and chromium chloride were equally as efficient. Subsequent experiments also established that chromium ions produced by reduction of dichromate with formic and oxalic acids were equally as suitable as the chromium chloride solution.

The results of dyeing the 8-hydroxyquinoline containing fibers with mordant dyes in a chromium chloride solution are given in Table II. In many cases, a precipitated dispersion or murkiness formed when the dye solution was added to the chromium containing liquor. The characteristics of the dye bath are also noted in Table II.

TABLE II.—DYEING OF POLYPROPYLENE CONTAINING 8-HYDROXYQUINOLINE WITH ACID MORDANT DYES IN THE PRESENCE OF ADDED CHROMIUM

| Dye | Color Depth | Solution |
|---|---|---|
| Calcochrome Brilliant Blue BBG | High | Ppt. |
| Calcochrome Orange R | Good | Ppt.[a,b] |
| Apochrome Yellow Y | do | Ppt.[b] |
| Apochrome Flavin Conc. | do | Ppt. |
| Erie Yellow KM | do | Ppt. |
| Aposide Violet BS | do | ([a]) |
| Solantine Yellow 5GA | do | Ppt.[a] |
| Chrome Yellow A Extra | do | Ppt. |
| Chromoxane Brilliant Violet 5BA | do | Ppt. |
| Fast Mordant Yellow GD Extra | do | Ppt.[a] |
| Chrome Fast Orange 3RLA | do | Clear.[a] |
| Erie Orange 2R | do | Ppt. |
| Diamond Green SSG | do | Ppt. |
| Acid Anthracene Brown GD | do | Ppt. |
| Erie Green GY | Poor | Ppt. |
| Diazine Orange GR | do | Clear. |
| Fast Mordant Blue B | do | Do. |
| Acid Alizarine Flavine RA | do | Do. |
| Acid Anthracene Brown RHA | do | Do. |
| Chrome Brown LLR | None | Do. |
| Acid Anthracene Brown PGA | do | Do. |

[a] These dyes were tested for dry cleaning fastness and were resistant to perchloroethylene.
[b] Did not fade after 20 hours' exposure in the fadeometer.

Comparing the dyeability with the dye structures listed in appendix Table I, it is significant that only dyes containing salicylic acid or o,o'-dihydroxy azo groups and one, or preferably no, sulfonic acid residues behaved well by this technique. The o-hydroxy-o'-amino azo and o-hydroxy-o-'carboxy azo structures are not useful.

Example 4

As reported in Table II, many of the dyes form some type of precipitate when added to the chromium chloride solution. In order to determine if such a precipitated dye would be effective, samples of chromium containing precipitates were prepared from three dyes. This was done by adding the dye solution to excess $CrCl_3 \cdot 6H_2O$ in water, filtering and drying. The weights of precipitated complexes obtained from 1 g. of dye were:

| Dye: | Wt. of chrome complex (g.) |
|---|---|
| Calcochrome Orange R | 1.0 |
| Apochrome Yellow Y | 0.4 |
| Erie Yellow KM | [1] 0.0 |

[1] Milky solution but could filter no prec.

These dyes were then used, along with a detergent dispersing agent, to dye fibers of unmodified polypropylene and polypropylene containing 8-hydroxyquinoline additive. The unmodified polypropylene was unstained. The modified fibers dyed well.

Thus, while not all dyes are simply obtainable as chromium precipitates (i.e., Erie Yellow KM) it is apparent that such precipitated complexes are readily applicable to fibers containing selected chelating agents.

Example 5

Example 3 was repeated but a 1% sulfuric acid solution was used in place of the chromium chloride in order to precipitate the acid dyes. No dye pickup was observed showing that precipitation, per se, is not the governing factor in getting dyeability.

Example 6

Example 3 was repeated using polypropylene fibers spun from a blend containing 1% picolinic acid which has a log K for chromium of about 6. This agent gave good fibers which had good dye pickup and retention.

Example 7

Example 3 was repeated using polypropylene fibers spun from a blend containing 1% quinolinic acid which has a log K for chromium of about 4.4. This agent gave good fibers which had good dyeability and good dye retention.

Example 8

Example 3 was repeated using a 1% diquanidine as chelating agent. Diquanidine has a log K with chromium of about 13.9. Good fibers were obtained and they were readily dyed.

Example 9

Example 3 was repeated using a 1% solution of 4-(2-aminoethyl) morpholine as the chelating (blending) agent. This material has a log K with chromium of about 3.5. While the blended polymer spun well into fibers, there was substantially no dye pickup with the dyes of this invention.

Example 10

Example 3 was repeated using a 1% solution of phenyl iminodiacetic acid as the chelating agent. This material has a log K with chromium of about 3.3. When the resulting fibers were contacted with the dyes, there was very poor or no dye pickup.

Example 11

Example 3 was repeated using 2-mercapto benzothiazole as the chelating agent. Fibers were obtained which dyed well, had good dry cleaning fastness and in addition had a light stability in the fadeometer of over 40 hours.

Similar results were obtained when nickel chloride rather than the chromium salt was used to metallize the dye.

This invention has been described in connection with certain specific embodiments thereof; however, it should be understood that these are by way of example rather than by way of limitation, and it is not intended that the invention be restricted thereby.

What is claimed is:

1. A process for dyeing a poly alpha olefin fiber with a metallized dye comprising the steps of:
    (a) blending an alpha olefin polymer with an unmetallized chelating agent having a chelate formation constant of at least $1 \times 10^4$ with the metal used,
    (b) forming said blended polymer into fibers,
    (c) immersing said fibers in an aqueous solution of a metallized dye containing no more than one sulfonic acid group, said dye being selected from the class consisting of dyes containing at least one salicylic acid function, and dyes containing at least one o,o'-dihydroxy azo function, said metal being selected from the groups consisting of nickel, copper, aluminum, iron, cobalt, and chromium.

2. The process of claim 1 wherein the polymer is polypropylene.

3. The process of claim 1 wherein the chelating agent is 8-hydroxyquinoline.

4. The process of claim 1 wherein the metallized dye is formed by contacting a solution of $CrCl_3$ with a dye having the formula

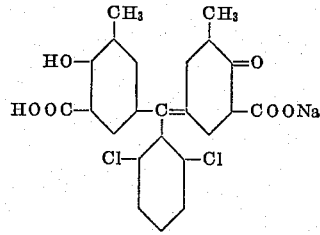

5. The process of claim 4 wherein the chelating agent is 8-hydroxyquinoline.

6. The process of claim 5 wherein the polymer is polypropylene.

7. The process of claim 4 wherein the chelating agent is 2-mercaptobenzothiazole.

8. The product of claim 1.

References Cited by the Examiner
UNITED STATES PATENTS

| | | | |
|---|---|---|---|
| 2,867,494 | 1/59 | Streck | 8—42 |
| 3,023,072 | 2/62 | Dabrowski | 8—82 |
| 3,097,044 | 7/63 | Skeuse | 8—55 |
| 3,097,196 | 7/63 | Straley et al. | 8—42 X |

NORMAN G. TORCHIN, *Primary Examiner.*